(12) United States Patent
Agarwal et al.

(10) Patent No.: US 10,517,015 B2
(45) Date of Patent: Dec. 24, 2019

(54) POWER CONSUMPTION OPTIMIZATION OF WIRELESS COMMUNICATION SYSTEMS FOR CONTENT DELIVERY

(71) Applicant: Avago Technologies General IP (Singapore) Pte. Ltd., Singapore (SG)

(72) Inventors: Amit Rajendra Agarwal, San Diego, CA (US); Prashant Katre, San Diego, CA (US); Hosahalli Rajarao Srinivas, Irvine, CA (US); Gregory J. Goodemote, Tustin, CA (US); Bismaya Parida, San Diego, CA (US); James Ching-Shau Yik, Laguna Niguel, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 15/965,615

(22) Filed: Apr. 27, 2018

(65) Prior Publication Data

US 2019/0335355 A1    Oct. 31, 2019

(51) Int. Cl.
*H04W 28/02* (2009.01)
*H04W 52/02* (2009.01)
*H04W 76/28* (2018.01)

(52) U.S. Cl.
CPC ... *H04W 28/0278* (2013.01); *H04W 28/0289* (2013.01); *H04W 52/0216* (2013.01); *H04W 76/28* (2018.02)

(58) Field of Classification Search
CPC ............. H04W 52/00; H04W 28/0278; H04W 28/0289; H04W 76/28; H04W 52/0216; H04W 52/0219; H04W 52/0235; H04W 52/0261; H04W 52/0277
See application file for complete search history.

(56) References Cited

U.S. PATENT DOCUMENTS

| 2013/0223419 | A1* | 8/2013 | Ghosh | H04W 52/0235 370/338 |
|---|---|---|---|---|
| 2013/0294307 | A1* | 11/2013 | Johansson | H04W 52/0209 370/311 |
| 2015/0181535 | A1* | 6/2015 | Cho | H04W 28/22 370/311 |

(Continued)

*Primary Examiner* — Kibrom T Hailu
(74) *Attorney, Agent, or Firm* — Morgan, Lewis & Bockius LLP

(57) ABSTRACT

A device implementing the subject wireless communication system may include one or more memories, and one or more processors coupled to the one or more memories. In some aspects, the one or more processors are configured to cause receiving a first frame comprising an indication that the station has data buffered at an access point, determining, in response to the first frame, whether a measured buffer depth exceeds a predetermined threshold, receiving a second frame comprising a predetermined amount of buffered data based on the measured buffer depth, transitioning, after the predetermined amount of buffered data is received, into a sleep mode for a first predetermined duration when the measured buffer depth exceeds the predetermined threshold, and transitioning into the sleep mode for a second predetermined duration less than the first predetermined duration when the measured buffer depth does not exceed the predetermined threshold.

20 Claims, 6 Drawing Sheets

(56) References Cited

U.S. PATENT DOCUMENTS

| | | | |
|---|---|---|---|
| 2016/0088681 A1* | 3/2016 | Chang | H04W 52/0216 |
| | | | 455/405 |
| 2017/0201940 A1* | 7/2017 | Koratekere Honnappa | |
| | | | H04W 52/0206 |
| 2017/0212865 A1* | 7/2017 | Yang | G06F 15/167 |
| 2017/0279725 A1* | 9/2017 | Lee | H04W 28/14 |
| 2018/0157607 A1* | 6/2018 | Gallagher | G06F 1/3234 |
| 2019/0069312 A1* | 2/2019 | Oh | H04W 72/04 |

\* cited by examiner

US 10,517,015 B2

POWER CONSUMPTION OPTIMIZATION OF WIRELESS COMMUNICATION SYSTEMS FOR CONTENT DELIVERY

TECHNICAL FIELD

The present description relates generally to wireless communication systems, including power consumption optimization of wireless communication systems for content delivery.

BACKGROUND

Traditionally set-top box platforms are used to receive data streams from a streaming server over a wired Ethernet connection and display them on to a display. Ethernet offers very high bandwidth, lower latency and lower power consumption than is required by such systems. When a wired network is replaced with a wireless network, power performance is adversely impacted based on inherent traits of a wireless medium.

BRIEF DESCRIPTION OF THE DRAWINGS

Certain features of the subject technology are set forth in the appended claims. However, for purpose of explanation, one or more implementations of the subject technology are set forth in the following figures.

DETAILED DESCRIPTION

Figure 1:
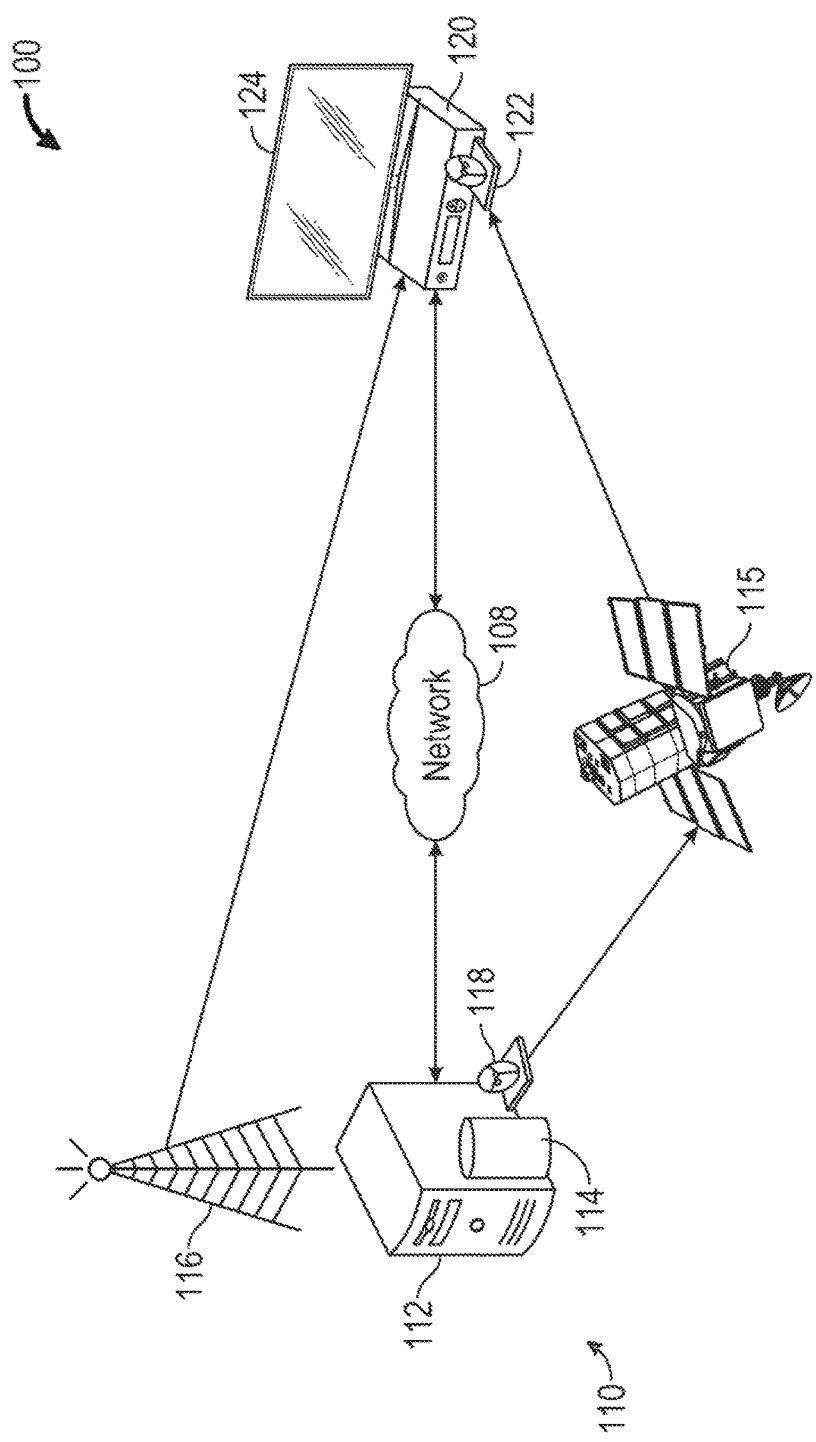
FIG. 1 illustrates an example network environment in which a video coding system may be implemented in accordance with one or more implementations.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more implementations. In one or more instances, well-known structures and components are shown in block diagram form in order to avoid obscuring the concepts of the subject technology.

Certain wireless communication systems, such as wireless local area networks (e.g., the Institute of Electrical and Electronics Engineers (IEEE) 802.11 specification), provide high bandwidth and lower latency communication medium but this requires the system to be always up and running which in turn consumes higher power. There is a power save mode defined in the 802.11 specification, which allows a wireless communication device (or station) to go into a deep sleep state while not transmitting or receiving frames over-the-air (OTA). In this power save mode, a station (STA) notifies an access point (AP) its intent to go into a sleep mode using a handshake. After the STA has transitioned into the sleep mode, the AP can store unicast messages (intended for the STA) to an internal buffer and notify the STA of the buffer status using traffic identification map (TIM) information in a beacon frame. The STA can read the TIM information and wake up to read the data packets buffered in the AP. When finished, the STA can again go back into the sleep mode. This mechanism allows the STA to periodically sleep and in turn reduce power consumption. However, the problem with this power save mode mechanism is that, for every packet, the STA needs to send a power save poll (PS-POLL) message. The amount of overhead needed to complete this task is significant for a wireless communication device (such as a set-top box) to cater to an audio/video (A/V) stream bandwidth and latency requirement.

Another aspect of the 802.11 specification is there is a significant amount of overhead contending for the medium. In a carrier sense multiple access/collision avoidance (CSMA/CA) mechanism, every wireless communication device has to contend for the medium and avoid any collisions. Every time there is a collision, any one of the wireless communication devices has to do a random back off and wait for the next transmit opportunity. This mechanism adds a lot of overhead in the system. Along with this is additional header information for every packet, which adds to the overhead. With features recently added to the 802.11 specification, any one of the wireless communication devices can aggregate media access control (MAC) service data units (MSDUs) and MAC protocol data units (MPDUs) into one data packet. Once the medium is granted, a block of data can be transferred in one transmission. This can lower the header overhead, and improve the overall efficiency.

In some implementations, the subject technology provides for receiving a first frame comprising an indication that the station has data buffered at an access point, determining, in response to the first frame, whether a measured buffer depth exceeds a predetermined threshold, receiving a second frame comprising a predetermined amount of buffered data based on the measured buffer depth, transitioning, after the predetermined amount of buffered data is received, into a sleep mode for a first predetermined duration when the measured buffer depth exceeds the predetermined threshold, and transitioning into the sleep mode for a second predetermined duration less than the first predetermined duration when the measured buffer depth does not exceed the predetermined threshold.

In other implementations, the subject technology provides for receiving a first frame comprising an indication that the station has data buffered at an access point, determining, in response to the first frame, whether a measured buffer depth exceeds a predetermined threshold, receiving a second frame comprising a first predetermined amount of buffered data when the measured buffer depth exceeds the predetermined threshold, receiving a third frame comprising a second predetermined amount of buffered data greater than the first predetermined amount of buffered data when the measured buffer depth does not exceed the predetermined threshold, and transitioning into a sleep mode for a predetermined duration.

FIG. 1 illustrates an example network environment 100 in which a video coding system may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example network environment 100 includes a content delivery network (CDN) 110 that is communicably coupled to an electronic device 120, such as by a network 108. The CDN 110 may include, and/or may be communicably coupled to, a content server 112 for encoding and/or transmitting encoded data streams, such as high-efficiency video coding (HEVC) encoded video streams, AV1 encoded video streams, and/or H.266 encoded video streams, over the network 108, an antenna 116 for transmitting encoded data streams over the air, and a satellite transmitting device 118 for transmitting encoded data streams to a satellite 115.

The electronic device 120 may include, and/or may be coupled to, a satellite receiving device 122, such as a satellite dish, that receives encoded data streams from the satellite 115. In one or more implementations, the electronic device 120 may further include an antenna for receiving encoded data streams, such as encoded video streams, over the air from the antenna 116 of the CDN 110. The content server 112 and/or the electronic device 120, may be, or may include, one or more components of the electronic system discussed below with respect to FIG. 2.

The network 108 may be a public communication network (such as the Internet, cellular data network, dialup modems over a telephone network) or a private communications network (such as private local area network ("LAN"), leased lines). The network 108 may also include, but is not limited to, any one or more of the following network topologies, including a bus network, a star network, a ring network, a mesh network, a star-bus network, a tree or hierarchical network, and the like. In one or more implementations, the network 108 may include transmission lines, such as coaxial transmission lines, fiber optic transmission lines, or generally any transmission lines, that communicatively couple the content server 112 and the electronic device 120.

The content server 112 may include, or may be coupled to, one or more processing devices, a data store 114, and/or an encoder. The one or more processing devices execute computer instructions stored in the data store 114, for example, to implement a content delivery network. The data store 114 may store the computer instructions on a non-transitory computer-readable medium. The data store 114 may further store one or more programs, e.g. video and/or audio streams, that are delivered by the CDN 110. The encoder may use a codec to encode video streams, such as an HEVC codec, an AV1 codec, an H.266 codec, or any other suitable codec.

For example, the encoder may encode a video stream using block size dependent filter selection for motion compensation, and/or using shorter interpolation filters for small blocks, which may largely reduce the memory bandwidth usage with minimum quality impact. In one or more implementations, the horizontal and vertical interpolation can have different filter lengths, the current block and overlapped areas can have different filter lengths, and the reference block may have a different size than the current block.

In one or more implementations, the content server 112 may be a single computing device such as a computer server. Alternatively, the content server 112 may represent multiple computing devices that are working together to perform the actions of a server computer (such as a cloud of computers and/or a distributed system). The content server 112 may be coupled with various databases, storage services, or other computing devices, such as an adaptive bit rate (ABR) server, that may be collocated with the content server 112 or may be disparately located from the content server 112.

The electronic device 120 may include, or may be coupled to, one or more processing devices, a memory, and/or a decoder, such as a hardware decoder. The electronic device 120 may be any device that is capable of decoding an encoded data stream, such as an encoded video stream.

In one or more implementations, the electronic device 120 may be, or may include all or part of, a laptop or desktop computer, a smartphone, a tablet device, a wearable electronic device, such as a pair of glasses or a watch with one or more processors coupled thereto and/or embedded therein, a set-top box, a television or other display with one or more processors coupled thereto and/or embedded therein, or other appropriate electronic devices that can be used to decode an encoded data stream, such as an encoded video stream.

In FIG. 1, the electronic device 120 is depicted as a set-top box, e.g. a device that is coupled to, and is capable of displaying video content on, a display 124, such as a television, a monitor, or any device capable of displaying video content. In one or more implementations, the electronic device 120 may be integrated into the display 124 and/or the display 124 may be capable of outputting audio content in addition to video content. The electronic device 120 may receive streams from the CDN 110, such as encoded data streams, that include content items, such as television programs, movies, or generally any content items. The electronic device 120 may receive the encoded data streams from the CDN 110 via the antenna 116, via the network 108, and/or via the satellite 115, and decode the encoded data streams, e.g. using the hardware decoder.

In some implementations, the CDN 110 exchanges frames with the electronic device 120 to transfer the content to the electronic device 120. In some examples, the frame exchange includes a data frame, a control frame, and/or a management frame. In some aspects, the management frame is used for exchanging management information that is not forwarded to a higher layer. Subtype frames of the management frame may include a beacon frame, an association request/response frame, a probe request/response frame, and an authentication request/response frame.

Figure 2:
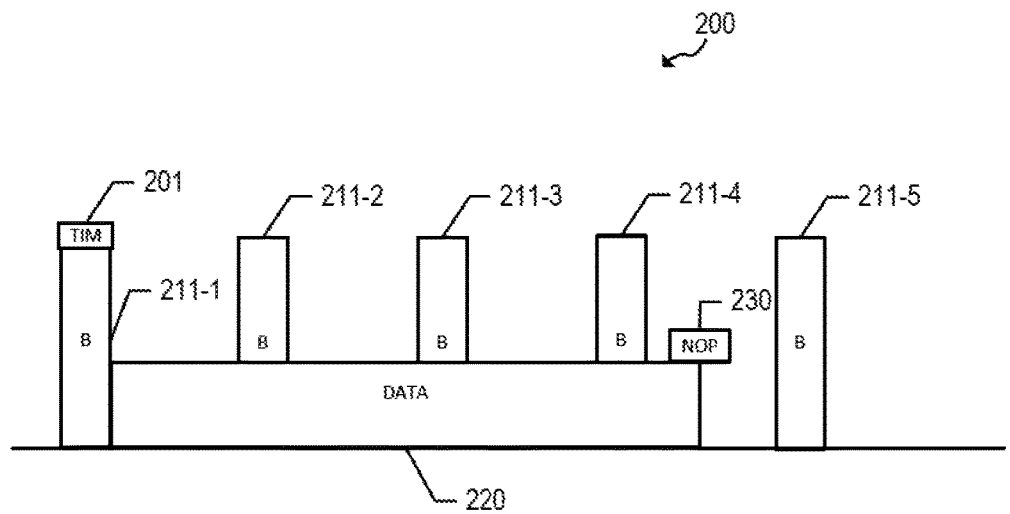
FIG. 2 conceptually illustrates an example of a timing diagram depicting a continuous data stream across multiple beacons.

FIG. 2 conceptually illustrates an example of a timing diagram 200 depicting a continuous data stream across multiple beacons. In this example, a data frame, a control frame, or a management frame can be exchanged between the CDN 110 and the electronic device 120. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

In FIG. 2, the continuous stream use case includes a streaming server (e.g., the content server 112) pushing a constant data rate to the electronic device 120 in a downlink transmission of the content delivery network. This continuous transmission of data by the content server 112 and continuous reception of data by the electronic device 120 forces the wireless radio of the electronic device 120 to be powered on for a significant amount of time to cater the incoming data as shown in FIG. 2.

In particular, the content server 112 (and/or the CDN 110) transmits a beacon frame 211-1 with a TIM indication 201. At this time, the electronic device 120 transitions into a normal mode and is fully powered on to receive a data frame transmission 220 that is transmitted by the content server 112. In this example, the length of the data frame transmission 220 (containing the data packets) is continuous and corresponds to a duration that includes three additional beacon frame intervals (e.g., 211-2, 211-3, 211-4) from the content server 112.

At the end of the data frame transmission 220, the electronic device 120 transmits a no-operation (NOP) indication to the content server 112 to inform the content server 112 that the electronic device 120 is transitioning into a power save mode (or sleep mode). The content server 112 transmits another beacon frame (e.g., 211-5) at some duration after the NOP indication is sent by the electronic device 120.

Figure 3:
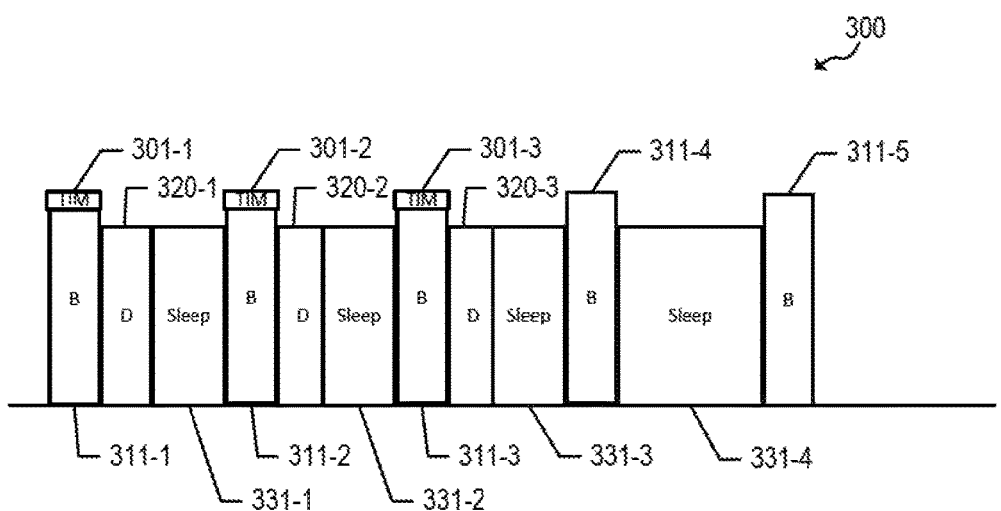
FIG. 3 conceptually illustrates an example of a timing diagram depicting bursts of data streams with respective beacons.

FIG. 3 conceptually illustrates an example of a timing diagram 300 depicting bursts of data streams with respective beacons. In this example, a data frame, a control frame, or a management frame can be exchanged between the CDN 110 and the electronic device 120. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

In some implementations, the electronic device 120 and the content server 112 perform a handshake to exchange information about resource allocation and transmission preferences of the electronic device 120. For example, the content server 112 and the electronic device 120 may exchange association frames, where the electronic device 120 establishes a connection with the content server 112 and conveys information to the content server 112 as to the amount of data to transmit to the electronic device 120 in a downlink transmission. In some aspects, the electronic device 120 may transmit an indication of a length of data requested by the electronic device 120 such that the length of data corresponds to a first duration during which the electronic device intends to be in the normal mode (or fully powered on) to receive a downlink transmission, of data packets. At the end of the length of data, the electronic device 120 transitions from the normal mode into the sleep mode for power consumption savings during which the content server 112 is instructed to store the remaining data packets in local buffers until the next opportunity to transmit to the electronic device 120.

As shown in FIG. 3, the content server 112 (and/or the CDN 110) transmits a beacon frame 311-1 with a first TIM indication 301-1 as part of a first downlink transmission to the electronic device 120. At this time, the electronic device 120 transitions, in response to the first TIM indication 301-1, into a normal mode and is fully powered on to receive a first data burst transmission 320-1 that is transmitted by the content server 112. At the end of receiving the first data burst transmission 320-1, the electronic device 120 transitions into the sleep mode for a predetermined duration.

In this example, the length of the first data burst transmission 320-1 is less than the length of the data frame transmission 220 (FIG. 2). The length of the first data burst transmission 320-1 corresponds to a duration set by the electronic device 120 in the prior handshake information. In some aspects, the duration is based on a buffer depth indicating an amount of data stored and ready for processing by the electronic device 120, where the amount of data stored in local buffers by the electronic device 120 determines whether the electronic device 120 should remain powered on or transition into the sleep mode. In this respect, if the buffer depth is increasing at a rate faster than the electronic device 120 can process the received data packets, then the electronic device 120 sets the requested length of the data bursts to a length that corresponds to the processing rate of the electronic device to allow the electronic device 120 sufficient time to process the buffered data packets during the sleep mode. Conversely, if the buffer depth is decreasing at a rate faster than the electronic device 120 can store the received data packets, then the electronic device 120 sets the requested length of the data bursts to a longer length to fill the buffers of the electronic device 120 such that the electronic device 120 will remain powered on for a relatively longer time to receive the additional requested data packets. In some implementations, the length of duration during which the electronic device is in the sleep mode is based on whether the measured buffer depth exceeds a predetermined threshold. For example, if the buffer depth exceeds the predetermined threshold, then the length of duration that the electronic device 120 would remain in the sleep mode increases. On the other hand, if the buffer depth does not exceed the predetermined threshold, then the length of duration that the electronic device 120 would remain in the sleep mode decreases. Similarly, if the buffer depth exceeds the predetermined threshold, then the predetermined amount of buffered data that the electronic device 120 would receive in a data burst transmission decreases. Conversely, if the buffer depth does not exceed the predetermined threshold, then the predetermined amount of buffered data that the electronic device 120 would receive in a data burst transmission increases.

In contrast to the frame exchange sequence of FIG. 2, the electronic device 120 can notify the AP (e.g., the content server 112) of going into the sleep mode for a small duration of time. While the electronic device 120 is in the sleep mode, the AP buffers the data (e.g., data not transmitted to the electronic device 120 prior to entry into the sleep mode) and notifies the electronic device 120 of pending data for transmission in a subsequent beacon message with a corresponding TIM indication. Once the subsequent beacon message (e.g., 311-2) is received with a second TIM indication (e.g., 301-2), the electronic device 120 transitions out of the sleep mode cycle (e.g., 331-1) and into the normal mode for receiving the next burst of data packets (e.g., 320-2). At the end of the second burst of data packets 320-2, the electronic device 120 transitions into the sleep mode cycle 331-2. Any pending data buffered by the AP is then communicated in a third beacon message 311-3 with a third TIM indication 301-3. Once the third beacon message 311-3 is received with the third TIM indication 301-3, the electronic device 120 transitions out of the sleep mode cycle 331-2 and into the normal mode for receiving a third burst of data packets 320-3. At the end of the third burst of data packets 320-3, the electronic device 120 transitions into the sleep mode cycle 331-3. In some implementations, the electronic device 120 responds to the AP with an acknowledgment frame after each of the beacon messages with an indication of the requested length for subsequent data burst transmissions. In some aspects, the requested length in this indication may be different from the requested length shared in the prior handshake with the AP. The requested length may be different when the buffer depths have changed since the prior handshake such that the duration of either the normal mode cycle and/or the sleep mode cycle also changes. In the normal mode, no PS-POLL is needed since the electronic device 120 is in a full power mode.

In FIG. 3, while the electronic device 120 is in the sleep mode, any data destined for the electronic device 120 is buffered by the AP. Because the AP has buffered the data, it can aggregate the data packets to a maximum and pass the aggregated data to the electronic device 120 at a higher modulation and coding scheme (MCS) and maximum bandwidth. The electronic device 120 can periodically transition back into the sleep mode and force the AP to buffer the data packets. This results in the electronic device 120 forcing the AP to aggregate additional data locally along with extending the amount of time the electronic device 120 can remain in the sleep mode. This power save scheme lowers the overall power consumption significantly. By adding this scheme to the frame exchange, the traffic pattern includes bursts of data packets received at the MAC layer. These bursts enable an amount of time that the electronic device 120 can remain in the sleep mode. During this duration of time that the electronic device 120 is in the sleep mode, the data buffered locally by the electronic device 120 from a previous burst can be played back on a display (e.g., 124) operatively coupled to the electronic device 120.

At each beacon frame interval, there are times when the electronic device 120 is receiving data and other times where the electronic device 120 is in the sleep mode. The mechanism depicted in FIG. 3 provides more favorable performance compared to the mechanism depicted in FIG. 2, where the electronic device 120 is not programmed to transition into the sleep mode at all. Even if there is more data buffered by the AP, the electronic device 120 would be awaken (or transition out of the sleep mode into the normal mode) for a specific duration of time and would transition back into the sleep mode immediately after. This sequence of mode changes assures lower power consumption. While in the sleep mode, the electronic device 120 is not allowed to wake up for transmission or reception operations to conserve power.

Figure 4:
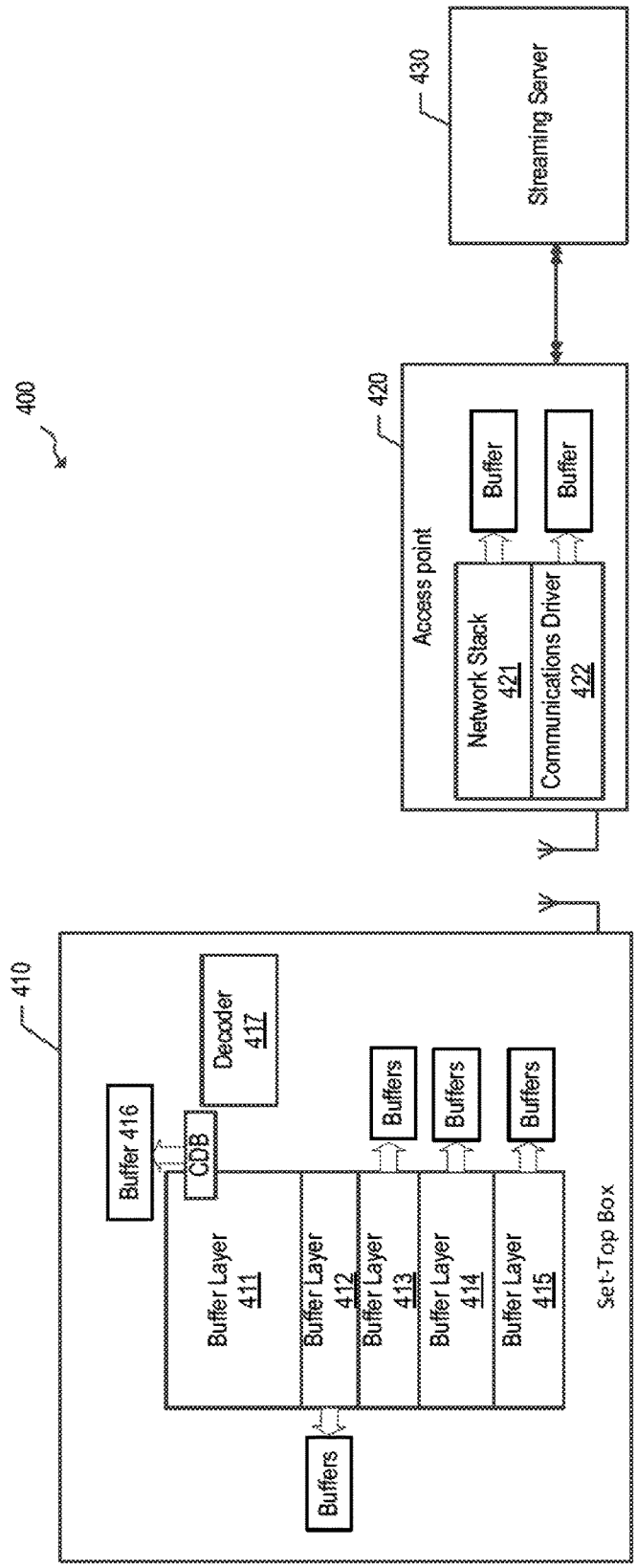
FIG. 4 conceptually illustrates a system diagram of an example wireless communication system in accordance with one or more implementations of the subject technology.

FIG. 4 conceptually illustrates a system diagram of an example wireless communication system 400 in accordance with one or more implementations of the subject technology. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

As shown in FIG. 4, the wireless communication system 400 includes a set-top box 410, an access point 420 and a streaming server 430. In some aspects, the set-top box 410 is, or a part of, the electronic device 120. In some implementations, the CDN 110 includes the access point 420 and the streaming server 430. In some aspects, the access point 420 is, or a part of, the content server 112. In other aspects, the streaming server 430 is, or a part of, the content server 112. In some implementations, the access point 420 includes a network stack 421 with a corresponding buffer and a communications driver 422 with a corresponding buffer.

In some implementations, the set-top box 410 has multiple layers of buffers (or collectively referred to as "buffer layers") as shown in FIG. 4. The buffer layers can be used to smoothen the effect of the bursts of data packets so that an end-user of the data streams does not notice any latency during playback. For example, the set-top box 410 includes buffer layers 411-415. In some aspects, each of the buffer layers corresponds to a different OSI layer. In one example, the buffer layer 411 may be transport layer with a corresponding buffer. In another example, the buffer layer 412 may be a play pump layer. In another example, the buffer layer 413 may be a socket layer. In some aspects, at least one of the buffer layers corresponds to managements operation of the set-top box 410. In one example, the buffer layer 414 may be a network stack layer. In another example, the buffer layer 415 may be a communications driver per the 802.11 specification.

The buffer layers (e.g., 411-415) may be filled up during the reception of the burst of data packets (e.g., 320-1, 320-2, 320-3) and drained during the sleep mode cycles (e.g., 331-1, 331-2, 331-3, 331-4). In some implementations, the subject algorithm addresses any adjustments to the buffer depth and duration between data bursts so that the decoder 417 does not run out of data to decode, render and/or playback and the buffers of the corresponding buffer layers (e.g., 411-415) do not overflow.

Also as shown in FIG. 4, the set-top box 410 can be configured to monitor different buffers in the set-top box 410, and based on the measured depth of each of the buffers, a processing circuit in the set-top box 410 can determine the duration that the set-top box 410 can be in the sleep mode. If the buffer depth is decreasing (e.g., data is consumed by the decoder 417 at a rate that is faster than the set-top box 410 stores the data in the buffers), then the set-top box 410 requests for more data to be transmitted, and in turn, the duration of time that the set-top box 410 can remain in the sleep mode is reduced. Similarly if the buffer depth is steady and/or increasing, then the set-top box 410 can expand the duration that the set-top box 410 goes into the sleep mode, and in turn, improves the power efficiency of the set-top box 410. Additionally, the access point 410 can assure that there is no packet drop by buffering the data locally in buffers associated with the network stack 421 and the communications driver 422.

Figure 5A:
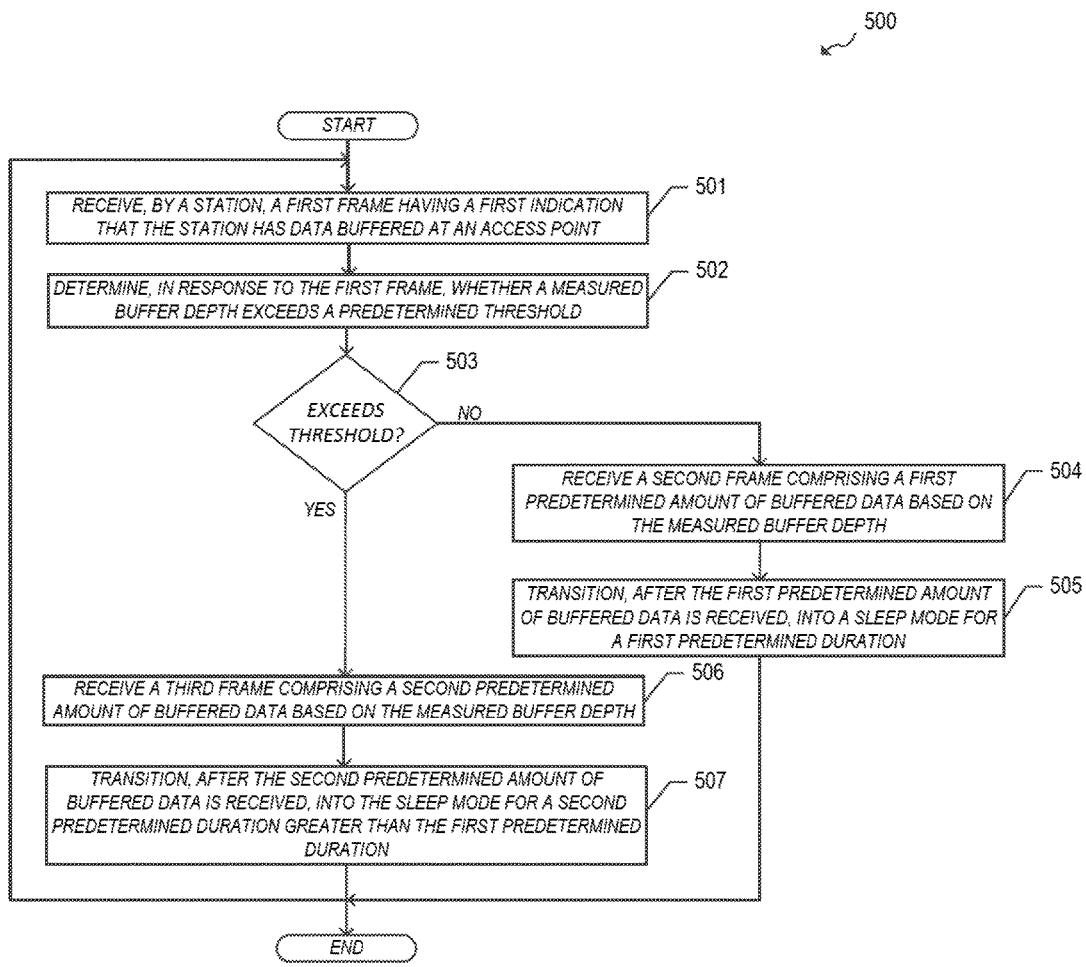
FIG. 5A illustrates a flow chart of an example process for power consumption optimization of wireless communication systems in accordance with one or more implementations of the subject technology.

FIG. 5A illustrates a flow chart of an example process 500 for power consumption optimization of wireless communication systems in accordance with one or more implementations of the subject technology. Further for explanatory purposes, the blocks of the sequential process 500 are described herein as occurring in serial, or linearly. However, multiple blocks of the process 500 may occur in parallel. In addition, the blocks of the process 500 need not be performed in the order shown and/or one or more of the blocks of the process 500 need not be performed.

The process 500 starts at step 501, where a station (e.g., the electronic device 120) receives a first frame having a first indication that the station has data buffered at an access point. Next, at step 502, the station determines, in response to the first frame, whether a measured buffer depth exceeds a predetermined threshold. At step 503, the process 500 proceeds to step 506 if the measured buffer depth exceeds the predetermined threshold. Otherwise, at step 503, the process 500 proceeds to step 504 when the measured buffered depth does not exceed the predetermined threshold. Subsequently, at step 504, the station receives a second frame comprising a first predetermined amount of buffered data based on the measured buffer depth. In some aspects, the first predetermined amount of buffered data is proportional to the measured buffer depth. In some implementations, the access point (e.g., 420) chooses to send the predetermined amount of buffered data to the station at a selected rate based on a number of factors including the bandwidth information (e.g., buffer depth status) from the station. Next, at step 505, the station, after the first predetermined amount of buffered data is received, transitions into a sleep mode for a first predetermined duration. When the measured buffer depth was determined to exceed the predetermined threshold, at step 506, the station receives a third frame comprising a second predetermined amount of buffered data based on the measured buffer depth. Subsequently, at step 507, the station, after the second predetermined amount of buffered data is received, transitions into the sleep mode for a second predetermined duration that is greater than the first predetermined duration. This mechanism of switching into the sleep mode for shorter and longer durations of time based on the buffer depths of the station improves the power consumption savings.

Figure 5B:
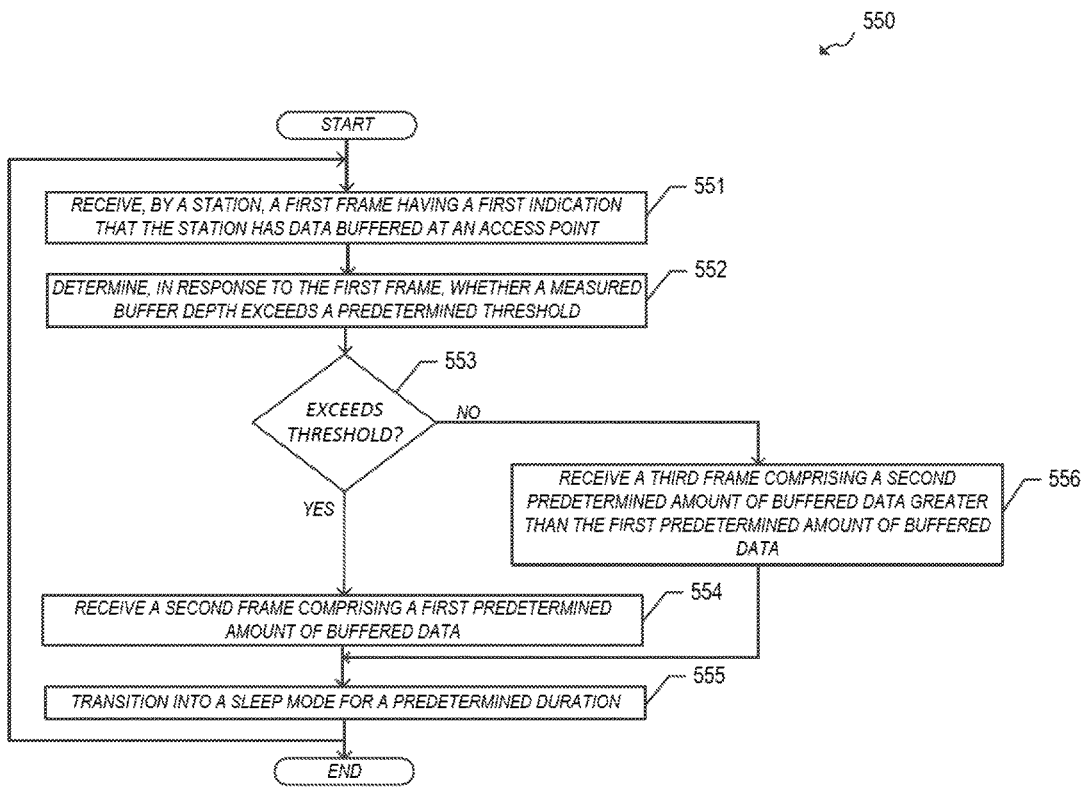
FIG. 5B illustrates a flow chart of another example process for power consumption optimization of wireless communication systems in accordance with one or more implementations of the subject technology.

FIG. 5B illustrates a flow chart of an example process 550 for power consumption optimization of wireless communication systems in accordance with one or more implementations of the subject technology. Further for explanatory purposes, the blocks of the sequential process 550 are described herein as occurring in serial, or linearly. However, multiple blocks of the process 550 may occur in parallel. In addition, the blocks of the process 550 need not be performed in the order shown and/or one or more of the blocks of the process 550 need not be performed.

The process 550 starts at step 551, where a station (e.g., the electronic device 120) receives a first frame having a first indication that the station has data buffered at an access point. Next, at step 552, the station determines, in response to the first frame, whether a measured buffer depth exceeds a predetermined threshold. At step 553, the process 550 proceeds to step 554 if the measured buffer depth exceeds the predetermined threshold. Otherwise, at step 553, the process 550 proceeds to step 556 when the measured buffered depth does not exceed the predetermined threshold. Subsequently, at step 554, the station receives a second frame comprising a first predetermined amount of buffered data based on the measured buffer depth. In some aspects, the first predetermined amount of buffered data is proportional to the measured buffer depth. Next, at step 555, the station, after the first predetermined amount of buffered data is received, transitions into a sleep mode for a predetermined duration. When the measured buffer depth was determined not to exceed the predetermined threshold, at step 556, the station receives a third frame comprising a second predetermined amount of buffered data that is greater than the first predetermined amount of buffered data. In this case, the buffer depth is measured to be greater than the threshold such that the buffers may be overflowing such that the electronic device 120 now would like to receive less buffered traffic data (or shorter duration of receiving data) and subsequently enter the sleep mode with a longer duration. Subsequently, at step 555, the station, after the second predetermined amount of buffered data is received, transitions into the sleep mode for the predetermined duration. This mechanism of switching into the sleep mode for shorter and longer durations of time based on the longer and shorter lengths of buffered data received, respectively, also improves the power consumption savings.

Figure 6:
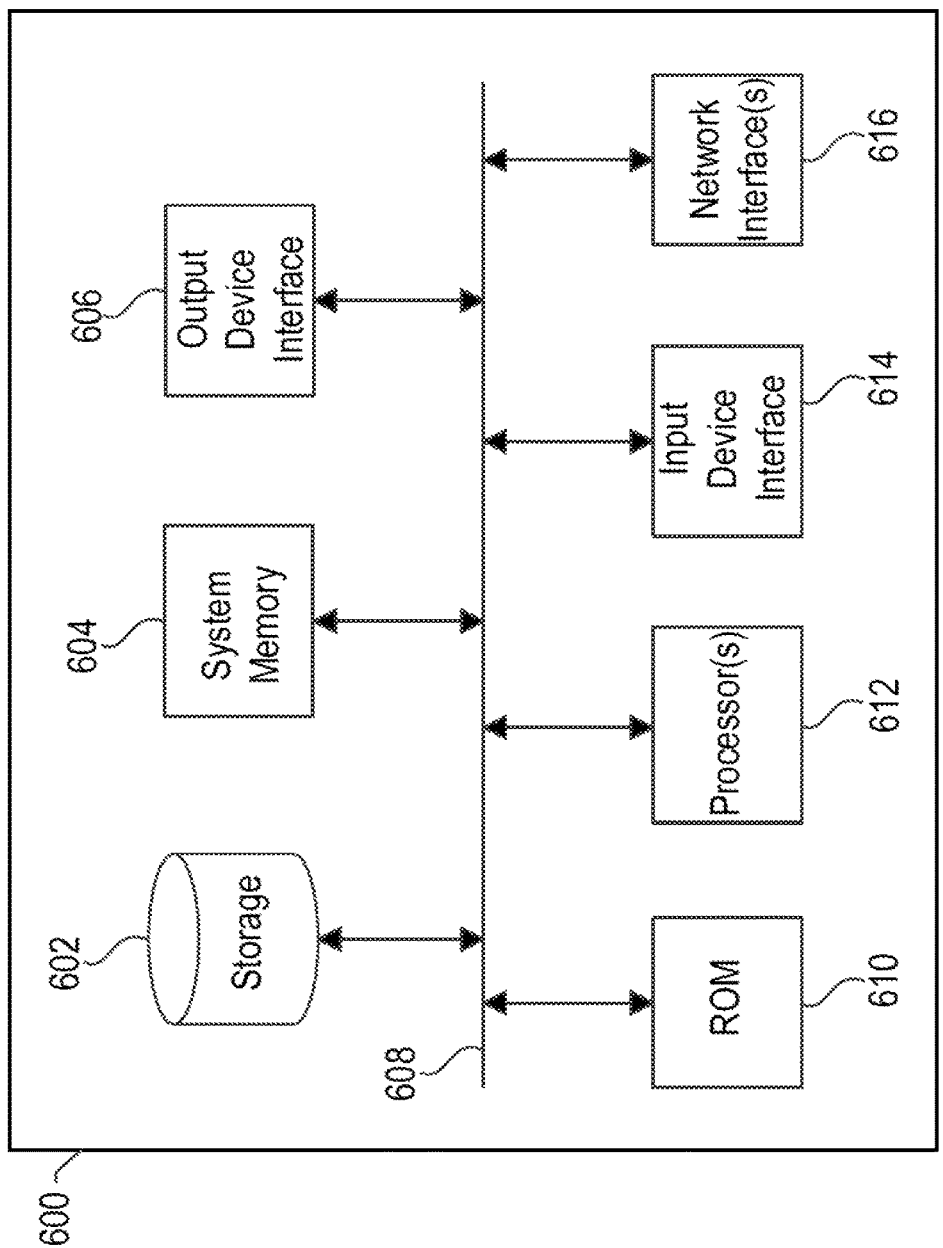
FIG. 6 conceptually illustrates an electronic system with which any implementations of the subject technology are implemented.

FIG. 6 conceptually illustrates an electronic system 600 with which one or more implementations of the subject technology may be implemented. The electronic system 600, for example, can be a network device, a media converter, a desktop computer, a laptop computer, a tablet computer, a server, a smartphone, or generally any electronic device that encodes and/or decodes video and/or audio streams. Such an electronic system 600 includes various types of computer readable media and interfaces for various other types of computer readable media. The electronic system 600 includes a bus 608, one or more processing unit(s) 612, a system memory 604, a read-only memory (ROM) 610, a permanent storage device 602, an input device interface 614, an output device interface 606, and a network interface 616, or subsets and variations thereof.

The bus 608 collectively represents all system, peripheral, and chipset buses that communicatively connect the numerous internal devices of the electronic system 600. In one or more implementations, the bus 608 communicatively connects the one or more processing unit s) 612 with the ROM 610, the system memory 604, and the permanent storage device 602. From these various memory units, the one or more processing unit(s) 612 retrieves instructions to execute and data to process in order to execute the processes of the subject disclosure. The one or more processing unit(s) 612 can be a single processor or a multi-core processor in different implementations.

The ROM 610 stores static data and instructions that are needed by the one or more processing unit(s) 612 and other modules of the electronic system. The permanent storage device 602, on the other hand, is a read-and-write memory device. The permanent storage device 602 is a non-volatile memory unit that stores instructions and data even when the electronic system 600 is off. One or more implementations of the subject disclosure use a mass storage device (such as a magnetic or optical disk and its corresponding disk drive) as the permanent storage device 602.

Other implementations use a removable storage device (such as a floppy disk, flash drive, and its corresponding disk drive) as the permanent storage device 602. Like the permanent storage device 602, the system memory 604 is a read-and-write memory device. However, unlike the permanent storage device 602, the system memory 604 is a volatile read and-write memory, such as random access memory. System memory 604 stores any of the instructions and data that the one or more processing unit(s) 612 needs at runtime. In one or more implementations, the processes of the subject disclosure are stored in the system memory 604, the permanent storage device 602, and/or the ROM 610. From these various memory units, the one or more processing unit(s) 612 retrieves instructions to execute and data to process in order to execute the processes of one or more implementations.

The bus 608 also connects to the input device interface 614 and the output device interface 606. The input device interface 614 enables a user to communicate information and select commands to the electronic system. Input devices used with the input device interface 614 include, for example, alphanumeric keyboards and pointing devices (also called "cursor control devices"). The output device interface 606 enables, for example, the display of images generated by the electronic system 600. Output devices used with the output device interface 606 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 6, the bus 608 also couples the electronic system 600 to one or more networks (not shown) through one or more network interfaces 616. In this manner, the computer can be a part of one or more network of computers, such as a peer-to-peer network, a local area network ("LAN"), a wide area network ("WAN"), or an Intranet, or a network of networks, such as the Internet. Any or all components of the electronic system 600 can be used in conjunction with the subject disclosure. Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (e.g., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A station for facilitating content delivery in a wireless network, the station comprising:
   one or more memories; and
   one or more processors coupled to the one or more memories, the one or more processors configured to cause:
   receiving a first frame comprising an indication that the station has data buffered at an access point,
   determining, in response to the first frame, whether a measured buffer depth exceeds a predetermined threshold,
   receiving a second frame comprising a predetermined amount of buffered data based on the measured buffer depth,
   transitioning, after the predetermined amount of buffered data is received, into a sleep mode for a first predetermined duration when the measured buffer depth exceeds the predetermined threshold, and
   transitioning into the sleep mode for a second predetermined duration less than the first predetermined duration when the measured buffer depth does not exceed the predetermined threshold.

2. The station of claim 1, wherein the one or more processors are further configured to cause:
   initiating a handshake operation with the access point to exchange information about resource allocation and transmission preferences of the station, wherein the handshake operation is performed prior to the first frame being received.

3. The station of claim 2, wherein the one or more processors are further configured to cause:
   transmitting length information to the access point that indicates how much buffered data to transmit in a downlink transmission with the station, the length information being based on the measured buffer depth.

4. The station of claim 1, wherein the one or more processors are further configured to cause:
   transitioning from the sleep mode to a normal mode upon detecting a second indication in a third frame subsequent to the second frame, the second indication indicating that the station has additional data buffered at the access point that is associated with the predetermined amount of buffered data.

5. The station of claim 1, wherein the one or more processors are further configured to cause: transmitting an indication to an access point that instructs the access point to store a remaining amount of data associated with the predetermined amount of buffered data during which the station is in the sleep mode.

6. The station of claim 1, wherein the first frame is a beacon frame.

7. The station of claim 1, wherein the indication is a traffic indication map (TIM).

8. A computer-implemented method in a station of facilitating communication in a wireless network, the method comprising:
   receiving a first frame comprising an indication that the station has data buffered at an access point;
   determining, in response to the first frame, whether a measured buffer depth exceeds a predetermined threshold,
   receiving a second frame comprising a predetermined amount of buffered data based on the measured buffer depth;
   transitioning, after the predetermined amount of buffered data is received, into a sleep mode for a first predetermined duration when the measured buffer depth exceeds the predetermined threshold; and
   transitioning into the sleep mode for a second predetermined duration less than the first predetermined duration when the measured buffer depth does not exceed the predetermined threshold.

9. The computer-implemented method of claim 8, further comprising:
   initiating a handshake operation with the access point to exchange information about resource allocation and transmission preferences of the station, wherein the handshake operation is performed prior to the first frame being received.

10. The computer-implemented method of claim 9, further comprising:
    transmitting length information to the access point that indicates how much buffered data to transmit in a downlink transmission with the station, the length information being based on the measured buffer depth.

11. The computer-implemented method of claim 8, further comprising:
transitioning from the sleep mode to a normal mode upon detecting a second indication in a third frame subsequent to the second frame, the second indication indicating that the station has additional data buffered at the access point that is associated with the predetermined amount of buffered data.

12. The computer-implemented method of claim 8, further comprising:
transmitting an indication to an access point that instructs the access point to store a remaining amount of data associated with the predetermined amount of buffered data during which the station is in the sleep mode.

13. The computer-implemented method of claim 8, wherein the first frame is a beacon frame.

14. The computer-implemented method of claim 8, wherein the indication is a traffic indication map (TIM).

15. A station for facilitating content delivery in a wireless network, the station comprising:
one or more memories; and
one or more processors coupled to the one or more memories, the one or more processors configured to cause:
receiving a first frame comprising an indication that the station has data buffered at an access point,
determining, in response to the first frame, whether a measured buffer depth of the data buffered at the access point exceeds a predetermined threshold,
receiving, from the access point, a second frame in response to transmission by the station of a determination result to the access point, the second frame comprising a first predetermined amount of buffered data when the measured buffer depth exceeds the predetermined threshold,
receiving, by the station from the access point, a third frame comprising a second predetermined amount of buffered data greater than the first predetermined amount of buffered data when the measured buffer depth does not exceed the predetermined threshold, and
transitioning into a sleep mode for a predetermined duration.

16. The station of claim 15, wherein the one or more processors are further configured to cause:
initiating a handshake operation with the access point to exchange information about resource allocation and transmission preferences of the station, wherein the handshake operation is performed prior to the first frame being received.

17. The station of claim 16, wherein the one or more processors are further configured to cause:
transmitting length information to the access point that indicates how much buffered data to transmit in a downlink transmission with the station, the length information being based on the measured buffer depth.

18. The station of claim 15, wherein the one or more processors are further configured to cause:
receiving a first frame comprising a second indication indicating that the station has additional data buffered at the access point that is associated with the first predetermined amount of buffered data or the second predetermined amount of buffered data; and
transitioning from the sleep mode to a normal mode upon detecting a second indication in a third frame subsequent to the second frame, the second indication, indicating that the station has additional data buffered at the access point that is associated with the predetermined amount of buffered data.

19. The station of claim 15, wherein the one or more processors are further configured to cause: transmitting an indication to an access point that instructs the access point to store a remaining amount of data associated with the predetermined amount of buffered data during which the station is in the sleep mode.

20. The station of claim 15, wherein the first frame is a beacon frame, and wherein the indication is a traffic indication map (TIM).

* * * * *